Aug. 5, 1952     S. O. MORRISON ET AL     2,605,901
FILTER FOR REMOVABLE CARTRIDGES

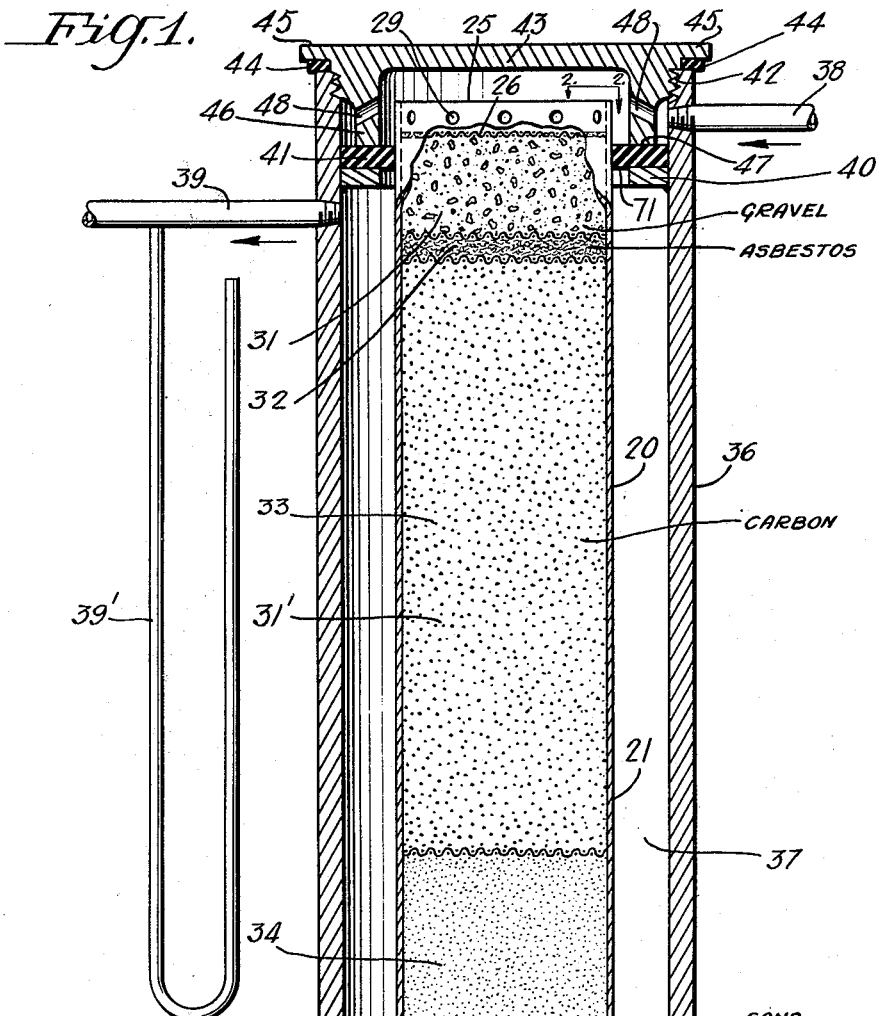
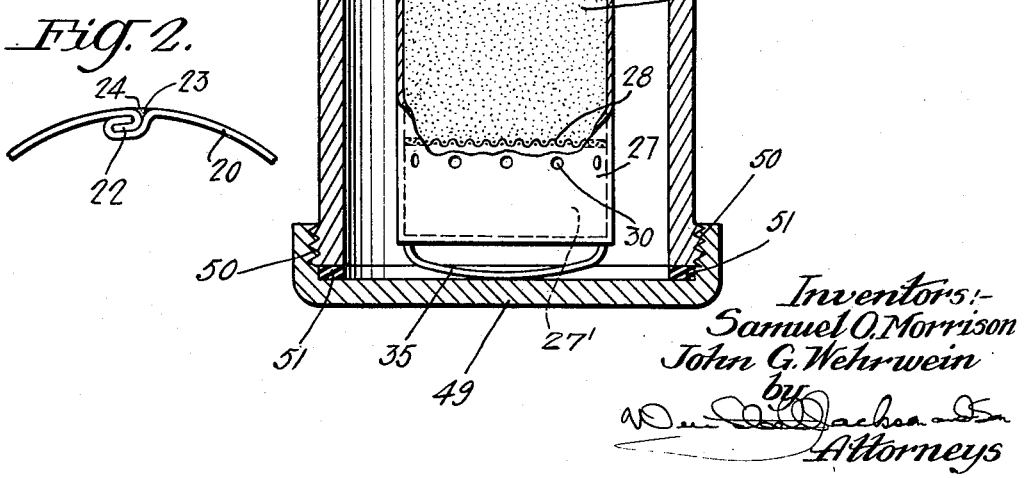

Filed Nov. 25, 1947     2 SHEETS—SHEET 2

Inventors:-
Samuel O. Morrison
John G. Wehrwein
by
Attorneys

Patented Aug. 5, 1952

2,605,901

UNITED STATES PATENT OFFICE 2,605,901

FILTER FOR REMOVABLE CARTRIDGES

Samuel O. Morrison, Media, and John G. Wehrwein, Havertown, Pa., assignors to Sunroc Refrigeration Company, Dover, Del., a corporation of Delaware Application November 25, 1947, Serial No. 788,024

3 Claims. (Cl. 210—131)

Our invention relates to a filter particularly intended for filtering water, but suitable for filtering other liquids.

A purpose of our invention is to simplify the removal and insertion of a removable filter cartridge from a filter case.

A further purpose is to minimize any deposit from raw water or the like on the filter casing.

A further purpose is to cheapen the construction of a filter cartridge and to avoid the necessity of providing connections as part of the cartridge.

A further purpose is to seal to the side wall of a filter cartridge which has inlet at one end and outlet at the other end against a partition surrounding the cartridge from the filter casing, by a packing supported against the partition and tightened by a gland extension from an end closure of the casing.

A further purpose is to improve the sealing at a longitudinal seam of the cartridge by providing filler metal in the seam.

A further purpose is to carry water or other liquid being filtered through a port or ports in the gland extension.

A further purpose is to support the cartridge resiliently at the end opposite the inlet to permit yielding of the same under abnormal pressure surges.

A further purpose is to position a trap for filter material in the bottom below the outlet of the filter cartridge and to carry the outlet to the sides above the trap.

A further purpose is to grip a cartridge resiliently by a surrounding resilient packing, leaving the cartridge unsupported otherwise except by a spring.

A further purpose is to accomplish the closure by tightening bars engaging tightening bar segments, and at one end extending through openings in the gland extension from the closure.

Further purposes appear in the specification and in the claims.

In the drawings we have chosen to illustrate a few only of the numerous embodiments in which our invention appears, choosing the forms shown from standpoints of convenience in illustration, satisfactory operation and clear demonstration of the principles involved.

Figure 1 is a central longitudinal and preferably vertical section through a filter embodying our invention.

Figure 2 is a fragmentary end elevation of the cartridge of Figure 1, in the position of the line 2—2 on Figure 1.

Figure 3:
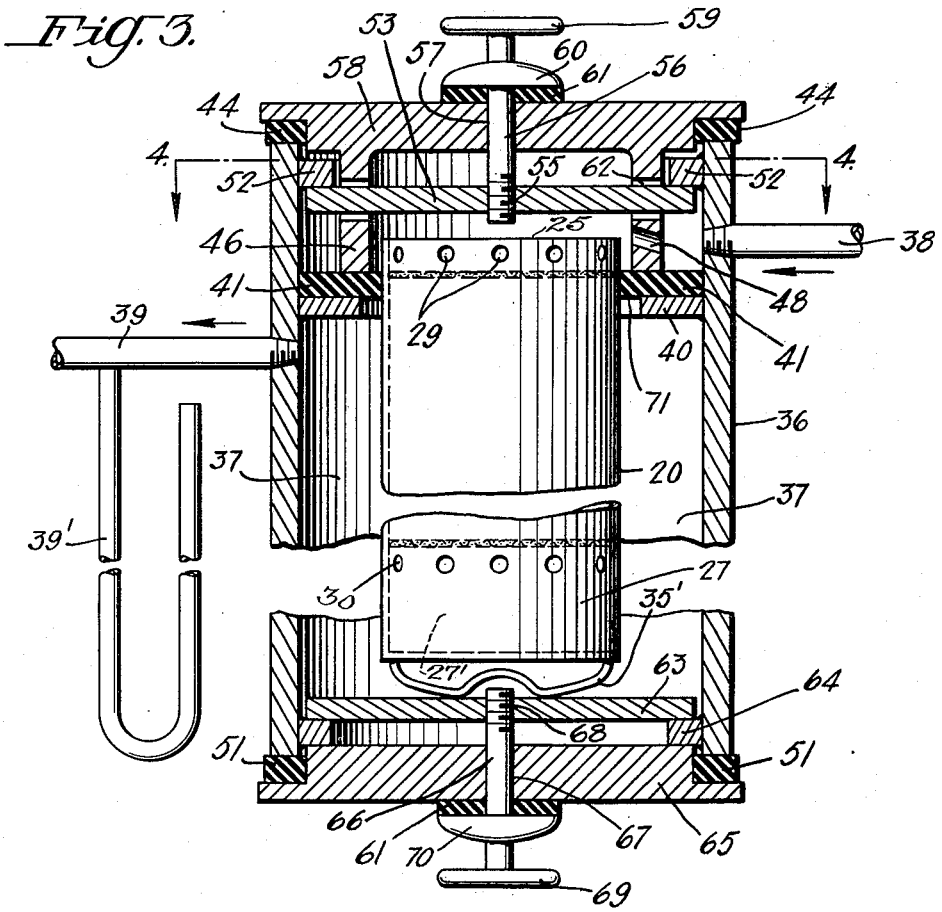
Figure 3 is a central longitudinal and preferably vertical broken section of a variant form of our device.

Describing in illustration but not in limitation and referring to the drawings:

In the prior art, liquid filters of the type which may be employed for filtering drinking water at or adjoining a dispenser such as a water cooler or drinking fountain have in some cases been provided with removable cartridges, but the construction in many instances has been so complicated that the expense of producing the cartridges or installing the same has frequently been excessive. Many of the prior art cartridge constructions have required rather high tolerances to avoid leakage or short circuiting of liquids and these have been difficult to maintain at reasonable cost, especially as one of the mating surfaces is normally subject to corrosion.

In our improved filter the cartridge construction itself is extremely simple and installation and replacement is accomplished very easily.

The cartridge 20 is of cylindrical or tubular form, and consists of a sheet metal side wall 21 which is imperforate almost from end to end and suitably joined together by a longitudinal lock seam 22. Since it is necessary to accomplish a seal against the outer circumference, the cavity of the seam is filled with filler metal 23 (Figure 2) such as solder or weld material, which is suitably smooth at the outer surface 24, to follow the curvature of the periphery.

In drinking water filter installations the cartridge will preferably be mounted vertically as shown, although the device may be used in filtering for other purposes or filtering other liquids, in which case mounting at some other angle may be desirable in a particular installation.

The filter cartridge is provided with an inlet 25 at one end, preferably the top, suitably through a screen 26, and similarly has an outlet 27 near the opposite end, preferably the bottom, suitably through a screen 28 and radial ports 30. To aid lateral flow beyond the inlet end, the side walls at this point are preferably perforated at 29.

The content of the cartridge will vary with the material filtered, but in the particular embodiment shown, which is intended for filtering without water softening, the filter media omit water softeners or zeolites which may be used in some cases. The sequence of filter elements in this case is first gravel 31, then asbestos 32, then activated carbon 33 and finally sand 34. Separating screens as shown are interposed between the layers. Of course, other materials may be included. For ordinary purposes the walls of the cartridge and the screens may be made of base metals, but it will be evident that where desired they or their effective outer surfaces may be of noble metal such as silver, for germicidal action.

The cartridge for purposes of transport is provided preferably at the bottom end with a bale or handle, which may desirably be a spring handle 35 which will permit carrying.

As shown in Figures 1 and 3, the radial outlet ports 30 from the cartridge are located well above the closed bottom of the filter to provide a hollow interior trap 27' which will catch and hold solid material escaping from the filter in case channeling or the like causes portions of the filter to pass through the outlet screen 28. The trap 27' assures that the escaping material will be caught in the cartridge and removed therewith, and will not collect in the filter housing.

The cartridge is surrounded in spaced relation by a metallic casing 36 preferably of cylindrical form, which is sufficiently larger than the cartridge to be spaced therefrom at 37 to permit flow around the cartridge. Inlet to the casing is provided preferably through a pipe 38 near the top, and outlet is provided preferably through a pipe 39 somewhat lower down. Between the inlet and outlet both of the cartridge and of the casing and surrounding the cartridge inside the casing is located a partition 40 suitably mounted on the interior of the casing wall and supporting, preferably on its upper side, a packing 41 of annular form which rests upon the partition at the bottom, contacts the cartridge at the inside throughout its circumference, and contacts the casing at the outside throughout its circumference.

The partition is located as close as possible to the inlet so that only a small portion of the casing at the top will be exposed to the slimes and other deposits in raw water, most of the casing interior being in contact only with filtered water or other liquid.

The packing 41 may be of any suitable material, but it will preferably be of reasonably soft rubber or synthetic rubber so that it can readily be compressed to engage firmly but resiliently against the casing and the cartridge.

The upper end of the casing is threaded preferably on the interior at 42 to receive a threaded top closure 43 and an end gasket 44 preferably of rubber or synthetic rubber, between a flange 45 of the closure and the end of the casing.

Downwardly extending from the closure 43 and surrounding the end of the cartridge is a packing gland 46 whose lower annular end or depending skirt 47 engages and compresses the packing 41. In order to permit flow of inlet water through the packing gland, suitably radial ports 48 are provided.

The bottom of the casing is closed by a bottom closure 49 threaded to the outside of the casing at 50 and compressing a packing 51 preferably of rubber or synthetic rubber, against the end of the casing.

The cartridge is resiliently supported endwise and in fact is floating on spring 35 which engages the end closure 49. The packing 41 is so resilient that floating action occurs notwithstanding the grip by the packing.

Figure 4:
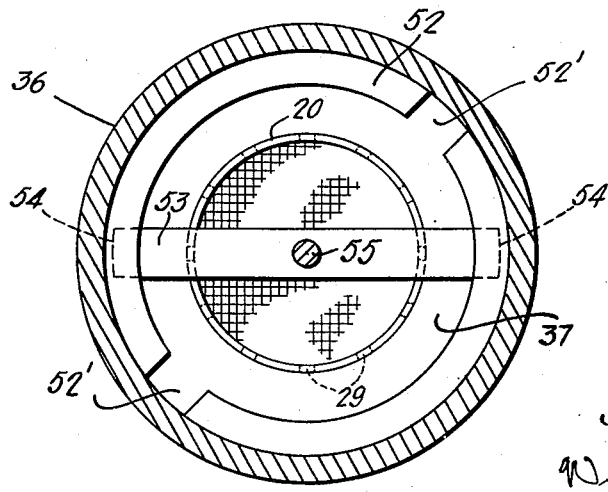
Figure 4 is a section on the line 4—4 of Figure 3.

In the form of Figures 3 and 4, the closures are modified but the device is otherwise the same. In this form tightening bar segments are provided in the interior of the casing near each end, suitably spaced at 52' for insertion and removal of the tightening bar. A tightening bar 53 at the top engages at 54 under the tightening bar segments 52 in closed position, and makes threaded engagement at 55 preferably at the center with a tightening screw 56 which extends through an opening 57 in the top closure 58 and has an exterior handle 59. A packing flange 60 on the tightening screw compresses a packing 61, preferably of rubber or synthetic rubber, around the opening 57.

The tightening bar is carried radially through slots 62 in the gland, the slots extending longitudinally far enough to provide for the longitudinal take-up in the tightening bar with respect to the gland.

Similarly at the bottom, tightening bar 63 engages behind tightening bar segments 64 spaced at 52' as in the case of the segments 52. The bottom closure 65 is drawn up to compress the packing 51 by a tightening screw 66 extending through a center opening 67 in the bottom closure and threaded into the tightening bar at 68. The tightening screw is provided with an exterior handle 69 and a packing flange 70 which compresses a packing 71, preferably of rubber or synthetic rubber, around the hole 67.

The bottom spring 35' is preferably slightly modified at the center as shown to avoid contact with the end of the tightening screw and to permit the spring to rest at least in part on the tightening bar 63.

It will be evident that the invention possesses a number of distinct advantages. Raw water or liquid to be filtered is likely to deposit slime, which is difficult to remove from the interior of the casing. All contact of the raw water with the casing is confined to the upper portion which is readily accessible by removing the upper closure for cleaning. At the interior of the casing around the space 37 contact is had only with filtered water or other liquid which is less likely to cause a deposit.

Depending upon the character of the installation, the cartridge may be inserted either from the bottom or the top as long as the top closure is loosened enough to take the pressure off the gasket 41. Thus the operator may in some cases remove both closures, or in other cases he may remove the top closure only or may loosen the top closure and remove the bottom closure only. The cartridge can readily be grasped either from the top or the bottom at the rim adjoining the ports 30 or by the bale 35 at the bottom.

In many cases, in water systems particularly, there are surges incident to turning on or shutting off water or due to water hammer, which are likely to do serious damage to the filter cartridge unless precautions are taken. It will be noted that the cartridge is supported by the spring 35 or 35' at the side away from or opposite to the inlet and that the only other point of engagement or support is by the resilient gasket which engages the side wall of the cartridge. Under abnormal conditions such as pressure surges, the cartridge is free to yield both against the spring 35 or 35' and also by resilient yielding of the gasket at its inner preferably overhanging edge 71 which extends inwardly substantially further than the inward extent of the partition as shown.

Furthermore slippage of the cartridge with respect to the packing is permitted in extreme pressure surges. This desirable feature greatly reduces the danger of damage to a cartridge of comparatively light construction.

As further protection against water hammer, a surge tube 39' is connected conveniently to the outlet by a T as shown and provides by its reverse bend and opposite closed end, an upstanding dead end portion which will hold a column of air and tend to absorb violent pressure surges in the system as well known in the art.

In operation, once the casing is installed, the replacement of the cartridge can be accomplished very readily by cutting off the water, loosening the top closure and removing either or both of the closures. Gaskets can be replaced readily at the closures, and the gasket 41 can also be replaced easily if required. As soon as the cartridge has been replaced and the closures tightened, operation can be resumed by admitting water or other liquid to pass through the filter. The flow will be from the inlet 38 through the ports 48 and through the ports 29 at the upper rim of the cartridge, or around the end, then through the length of the cartridge and out the bottom through the ports 30 or around the bottom of the cartridge, up through the space 37 surrounding the cartridge and out the outlet 39.

It will be evident that the cartridge can be removed either from the top or the bottom of the casing at will.

In view of our invention and disclosure variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a filter, a vertical tubular casing, a pair of spaced tightening segments on the interior of the casing near the bottom, a tightening bar supported by the segments in closed position, a cap at the bottom of the casing, a tightening screw extending through the cap and making threaded connection with the tightening bar, packing between the bottom cap and the casing, packing between the tightening screw and the bottom cap, a filter cartridge of tubular form resting on the tightening bar and extending vertically inside the casing in spaced relation, the cartridge having end inlet and outlet and tubular side walls capable of sealing between the inlet and the outlet, a partition on the casing extending inwardly at a point intermediate the ends of the cartridge and surrounding the same, walls forming an inlet to the interior of the casing at one side of the partition, walls forming an outlet from the interior of the casing at the other side of the partition, a second pair of spaced tightening segments on the interior of the upper portion of the casing above the partition, a packing resting on the top of the partition and engaging the partition on the bottom, the casing on the outside and the cartridge on the inside, a second tightening bar extending across below the second tightening segments and secured thereon in closed position, a closure for the top of the casing, a second tightening screw extending through the closure and engaging the second tightening bar, packing between the top closure and the casing, packing between the second tightening screw and the top closure, and a packing gland on the top closure extending down and engaging and compressing the packing resting on the top of the partition, having openings through which the tightening bar at the top extends, the openings being larger than the tightening bar.

2. In a filter, a tubular cartridge having a generally straight cartridge housing provided with an inlet at one end and an outlet at the other end and having a loose finely divided filter medium inside the housing, a casing surrounding the cartridge and having a closure at the one end corresponding to the outlet of the cartridge, an inlet fitting connecting to the casing at the end corresponding to the inlet of the cartridge, an outlet fitting connecting to the casing at a point spaced along the length of the cartridge from the inlet fitting, a partition extending radially inwardly from the inside of the casing at a position between the inlet and outlet fittings and terminating inwardly adjacent a portion of the outside housing of the cartridge which is straight and cylindrical, a resilient packing ring supported on the side of the partition toward the inlet of the cartridge, occupying the space between the interior of the casing and the exterior of the cartridge and engaging the exterior of the cartridge yieldably, the cartridge being free to yield resiliently longitudinally under pressure surges, a closure cap at the end of the casing adjoining the inlet fitting having a depending skirt provided with a port surrounding the end of the cartridge and engaging the end of the packing ring remote from the partition, and means for pressing the closure cap against the casing and pressing the skirt against the packing ring.

3. In a filter, a tubular cartridge having a generally straight cartridge housing provided with an inlet at one end and an outlet at the other end and having a loose finely divided filter medium inside the housing, a casing surrounding the cartridge and having a closure at one end corresponding to the outlet of the cartridge, an inlet fitting connecting to the casing at the end corresponding to the inlet of the cartridge, an outlet fitting connecting to the casing at a point spaced along the length of the cartridge from the inlet fitting, a partition extending radially inwardly from the inside of the casing at a position between the inlet and outlet fittings and terminating inwardly adjacent a portion of the outside housing of the cartridge which is straight and cylindrical, a resilient packing ring supported on the side of the partition toward the inlet of the cartridge, occupying the space between the interior of the casing and the exterior of the cartridge and engaging the exterior of the cartridge yieldably, the cartridge being free to yield resiliently longitudinally under pressure surges, a closure cap at the end of the casing adjoining the inlet fitting having a depending skirt provided with a port surrounding the end of the cartridge and engaging the end of the packing ring remote from the partition, means for pressing the closure cap against the casing and pressing the skirt against the packing ring, and a spring interposed between the cartridge and the closure at the end corresponding to the outlet of the casing, resiliently supporting the cartridge.

SAMUEL O. MORRISON.
JOHN G. WEHRWEIN.

REFERENCES CITED

The following references are of record in the file of this patent:

UNITED STATES PATENTS

| Number | Name | Date |
|---|---|---|
| 316,925 | Vogel | Apr. 28, 1885 |
| 433,710 | Aims, Jr. | Aug. 5, 1890 |
| 573,409 | Hasenpflug | Dec. 15, 1896 |
| 752,873 | Sweeney | Feb. 23, 1904 |
| 768,951 | Rawson | Aug. 30, 1904 |
| 857,736 | Hodgson | June 25, 1907 |
| 1,082,024 | Held | Dec. 23, 1913 |
| 1,430,234 | Keithline | Sept. 26, 1922 |
| 2,103,434 | Pennebaker | Dec. 28, 1937 |
| 2,295,097 | Waugh | Sept. 8, 1942 |
| 2,354,380 | Kasten | July 25, 1944 |
| 2,364,617 | Bolser | Dec. 12, 1944 |
| 2,439,936 | Kasten | Apr. 20, 1948 |

FOREIGN PATENTS

| Number | Country | Date |
|---|---|---|
| 2,424 | Great Britain | 1898 |